United States Patent
Bai et al.

(10) Patent No.: US 12,199,448 B2
(45) Date of Patent: Jan. 14, 2025

(54) SYSTEM AND METHOD FOR DYNAMICALLY ADJUSTING COUPLING COEFFICIENTS OF NON-CONTACT TRANSMISSION MAGNETIC MECHANISM

(71) Applicants: CHINA NATIONAL PETROLEUM CORPORATION, Beijing (CN); CNPC CHUANQING DRILLING ENGINEERING COMPANY LIMITED, Sichuan (CN)

(72) Inventors: Jing Bai, Sichuan (CN); Lei Li, Sichuan (CN); Dengyun Lu, Sichuan (CN); Jichuan Zhang, Sichuan (CN); Yi Xie, Sichuan (CN); Weicheng Li, Sichuan (CN); Lichun Jia, Sichuan (CN); Chongjun Huang, Sichuan (CN); Liming Fan, Sichuan (CN)

(73) Assignees: CHINA NATIONAL PETROLEUM CORPORATION, Beijing (CN); CNPC CHUANQING DRILLING ENGINEERING COMPANY LIMITED, Sichuan (CN)

(*) Notice: Subject to any disclaimer, the term of this patent is extended or adjusted under 35 U.S.C. 154(b) by 295 days.

(21) Appl. No.: 17/928,268

(22) PCT Filed: May 25, 2021

(86) PCT No.: PCT/CN2021/095727
§ 371 (c)(1),
(2) Date: Nov. 28, 2022

(87) PCT Pub. No.: WO2021/238901
PCT Pub. Date: Dec. 2, 2021

(65) Prior Publication Data
US 2023/0223789 A1 Jul. 13, 2023

(30) Foreign Application Priority Data

May 29, 2020 (CN) .......................... 202010472034.6

(51) Int. Cl.
*H02J 50/12* (2016.01)
*H02M 7/06* (2006.01)

(52) U.S. Cl.
CPC ............... *H02J 50/12* (2016.02); *H02M 7/06* (2013.01)

(58) Field of Classification Search
CPC ................................ H02J 50/12; H02M 7/06
See application file for complete search history.

(56) References Cited

U.S. PATENT DOCUMENTS 9,800,076 B2 * 10/2017 Jadidian ................. H02J 50/90
11,632,001 B2 * 4/2023 Bae ........................ H02J 50/90
307/104

FOREIGN PATENT DOCUMENTS

CN 107112812 A * 8/2017 ............ B60L 53/12
CN 108141063 A * 6/2018 ............ H02J 50/12
(Continued)

OTHER PUBLICATIONS

CN 111682652, machine translation (Year: 2020).*

*Primary Examiner* — Thomas J. Hiltunen
*Assistant Examiner* — Khareem E Almo

(57) ABSTRACT

A system for dynamically adjusting coupling coefficients of a non-contact transmission magnetic mechanism, wherein a power supply end is connected to a non-contact transmission electric energy conversion module and a magnetic field regulation electric conversion module respectively by means of an input power consumption measurement unit, the non-contact transmission electric energy conversion module is connected to a transmitting coil by means of a tuning wave-blocking circuit, a receiving coil is provided corre- (Continued)

sponding to the transmitting coil, the receiving coil is provided on the wave-blocking circuit, the wave-blocking circuit is connected to a load end by means of a rectifying and voltage stabilizing circuit and an output power consumption measurement module, signal loading and extraction modules having a controller and a signal modulation and demodulation module are connected in parallel to two ends of the transmitting coil and the receiving coil.

15 Claims, 2 Drawing Sheets

(56) References Cited

FOREIGN PATENT DOCUMENTS

| CN | 109546758 A | * | 3/2019 | ............. H02J 50/10 |
| CN | 111682652 A | * | 9/2020 | ............. H02J 50/10 |
| CN | 115378146 A | * | 11/2022 | |

* cited by examiner

SYSTEM AND METHOD FOR DYNAMICALLY ADJUSTING COUPLING COEFFICIENTS OF NON-CONTACT TRANSMISSION MAGNETIC MECHANISM

BACKGROUND OF THE PRESENT INVENTION

Field of Invention

The present invention relates to the technical field of oil drilling, and more particularly to a system and method for dynamically adjusting coupling coefficients of a non-contact transmission magnetic mechanism.

Description of Related Arts

Non-contact power transmission, also called wireless power transmission, or wireless power transmission, refers to converting electric energy into other forms of relay energy such as electromagnetic field energy, laser, microwave and mechanical wave, etc. After transmitted in a certain distances in the air, the relay energy is converted into electrical energy through the receiver to realize wireless energy transmission.

Non-contact power transmission transmits power and signals in a non-contact manner through electric field coupling, which solves the problem of energy supply and information interaction between rotating parts in a rotary steerable system. The efficiency of non-contact power transmission is determined by the coupling coefficient of the transmitting coil and the receiving coil, and the coupling coefficient is affected by parameters such as the core material, shape, and coil distance. In the product development stage, experimental tests are often carried out to determine the best coupling coefficients for the target characteristics, so as to complete the physical design of the non-contact transmission magnetic mechanism, to achieve the optimal transfer of energy.

As in the conventional art with publication number of CN102570627A, and a publication date of Jul. 11, 2012, and the Chinese invention patent document named "power supply device and non-contact power supply system provided with power supply device" discloses a power supply device using an electromagnetic resonance coupling method and a non-contact power supply system. The coupling coefficient of the electromagnetic induction coupling in the power supply device and/or inside the power receiving device is optimized to improve the power transmission efficiency at the resonance frequency regardless of the positions of the power supply device and the power receiving device. There is provided a power supply device or a non-contact power supply system in which an S11 parameter which is a reflected portion of electric power output from a high-frequency power supply of the power supply device is monitored, and the parameters of a transmission coil and a first resonance coil in the power supply device are changed. position and one or both of the positions of the receiving coil and the second resonant coil in the power receiving device, so as to adjust the coupling coefficient of the electromagnetic induction coupling.

However, in the application environment of drilling guide, complex environments such as high temperature, high pressure and mud medium often exist at the bottom of the well, so that the optimal coupling coefficient of the magnetic mechanism is shifted, which leads to the non-contact transmission magnetic mechanism of special development in the actual application process, the optimal transfer of energy cannot be achieved, and in extreme cases, the transfer efficiency will be greatly reduced.

SUMMARY OF THE PRESENT INVENTION

In order to overcome the problems and deficiencies in the above-mentioned prior art, the present invention aims at providing a kind of coupling coefficient dynamic adjustable non-contact transmission magnetic mechanism design idea, increases a compensating coil, to the magnetic field of transmitting coil or receiving coil The system and method for dynamically adjusting the coupling coefficient of a non-contact transmission magnetic mechanism for optimal energy transfer are realized by exerting an influence and increasing or decreasing the magnetic field intensity according to the deviation of the coupling coefficient, thereby changing the coupling coefficient of the magnetic mechanism.

The present invention provides a A system for dynamically adjusting coupling coefficients of non-contact transmission magnetic mechanism, wherein: a power supply end is respectively connected with a non-contact transmission power conversion module and a magnetic field regulation power conversion module through an input power consumption measurement unit; the non-contact transmission power conversion module is connected with a transmitting coil via a tuned wave blocking circuit; the transmitting coil is correspondingly provided with a receiving coil, the receiving coil is provided on the tuned wave blocking circuit, the wave blocking circuit is connected to a load terminal through a rectifying voltage stabilizing circuit and an output power consumption measurement module; both ends of the transmitting coil and the receiving coil are connected in parallel with a signal loading and extraction module with a controller and a signal modulation and demodulation module; and the magnetic field control and electric energy conversion module is also connected with a compensation coil through a wave blocking circuit.

The system for dynamically adjusting coupling coefficients of non-contact transmission magnetic mechanism, as recited in claim 1, wherein the wave blocking circuit of the magnetic field control and electric energy conversion module comprises a three-phases compensation capacitor and compensation coil parallel-circuit respectively connected with a current direction regulating device via bidirectional diodes, and the bidirectional diode is turned on and off under control of a PWM pulse.

Preferably, the signal loading extraction module extracts the electrical signals at both ends of the transmitting coil and the receiving coil and passes through the demodulation of the signal modulation and demodulation module generates a signal for the controller to identify, and the controller sends a control instruction to the signal modulation and demodulation module according to the received signal, and the signal modulation and demodulation module converts the control instruction to a control signal for loading the extraction module on the signal.

Preferably, the non-contact energy transmission end and the receiving end are both provided with a power monitoring device for contacting transmission power and reception devices for monitoring the contact transmission system to calculate the energy transfer efficiency, that is, the energy transfer efficiency=received power/transmitted power, if the energy transfer efficiency becomes low, then every fixed time X will add a positive direction of size C to the compensation coil, the current is tested for N times in total, and the energy transfer efficiency is calculated;

if the change trend of energy transfer efficiency is a monotonous increase in N tests, continue to increase the forward current of size C to the compensation coil at fixed intervals X, and calculate the energy transfer efficiency in real time until the change trend of transfer efficiency begins to decrease, the current corresponding to the maximum transfer efficiency is the final correction current, and this current is continuously output to the compensation coil;

if in the N tests, the energy transfer efficiency increases and the extreme value appears, the current corresponding to the maximum transfer efficiency is used as the final correction current, and the current is continuously output to the compensation coil;

if the energy transfer efficiency decreases monotonously in N times of tests, turn on the reverse current adjustment, and apply a reverse current of size C to the compensation coil every fixed time X to increase the energy transfer efficiency until the extreme value appears, the current corresponding to the and the maximum transfer efficiency is the final correction current, which is continuously output to the compensation coil.

Preferably, each time the forward current is increased or the reverse current is applied at a fixed time interval of 100 ms, and a size of increasing the forward current or applying the reverse current for each time is 10 mA.

Preferably, the number of tests N is an integer ≥3.

Preferably, the current corresponding to the maximum transmission efficiency is the final correction current, and the current is continuously output to the compensation coil finally, it also comprises continuing to extract the input power of the transmitting coil and the output power of the receiving coil through the records of the signal loading and extraction module with a controller and a signal modulation and demodulation module at both ends of the transmitting coil and the receiving coil according to a fixed time interval, calculating the energy transfer efficiency, and repeating the above adjustments if the energy transfer efficiency decreases.

Compared with prior art scheme, the beneficial effect of technical scheme of the present invention is as follows:

The invention has the advantage of realizing the dynamic adjustment of the coupling coefficient of the magnetic mechanism, ensuring that the system works in the best energy efficiency state in any environment, and improving the adaptability and economy of the system. The principle of electromagnetic coupling power transmission is to use the magnetic field between the transmitting coil and the receiving coil to realize the wireless transmission of power. According to the transmission theory, the energy transmission efficiency is determined by the coupling coefficient (a characteristic of the magnetic field) between the coils. Both The relationship does not change linearly. Therefore, at the time of design, the optimal coupling coefficient of the system is often determined in the indoor test by simulating the target working conditions to guide the completion of the design of the non-contact transmission magnetic mechanism, i.e. the coupling coefficient is fixed. However, the downhole environment, bottomhole temperature and pressure often change. Affected by this, the optimal coupling coefficient will drift, resulting in the inherent coupling coefficient of the original design not being able to keep the system in the optimal energy transfer state. For this reason, a compensation coil is added in this scheme. The influence parameters of the compensation magnetic field include current magnitude, direction and number of coil turns. By changing the current and direction passing through the coil, a compensation magnetic field can be formed between the transmitting coil and the receiving coil. The compensation magnetic field is superimposed/cancelled with the fixed magnetic field between the transmitting coil and the receiving coil to change the magnetic field between the transmitting coil and the receiving coil, that is, to dynamically adjust the coupling coefficient of the non-contact transmission magnetic mechanism, so that the non-contact transmission magnetic mechanism is always at the optimum state.

BRIEF DESCRIPTION OF THE DRAWINGS

The preceding and following detailed descriptions of the present invention become clearer when read in conjunction with the accompanying drawings.

DETAILED DESCRIPTION OF THE PREFERRED EMBODIMENT

Embodiment Below further illustrate realizing the object technical scheme of the present invention by several specific examples, it should be noted that the technical scheme claimed in the present invention includes but not limited to following examples.

Embodiment 1

Figure 1:
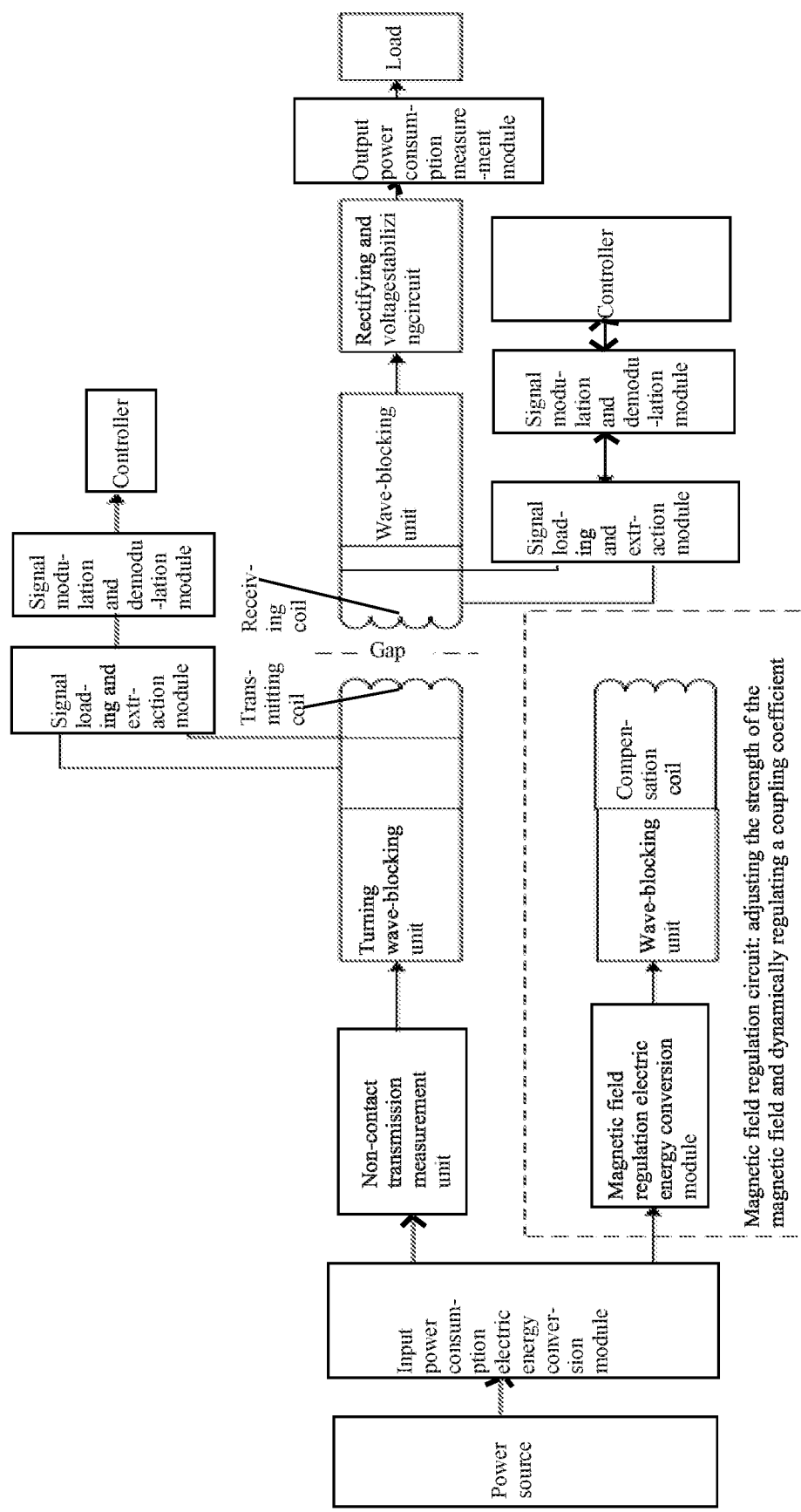
FIG. 1 is the system structural representation of a system for dynamically adjusting coupling coefficients of a non-contact transmission magnetic mechanism of the present invention.

As a specific implementation of the system of the present invention, as shown in FIG. 1, a non-contact transmission magnetic mechanism coupling coefficient dynamic adjustment system is disclosed. The transformation module, the non-contact transmission power conversion module is connected to the transmitting coil through the tuning wave blocking circuit, the transmitting coil is correspondingly provided with a receiving coil, the receiving coil is arranged on the wave blocking circuit, and the wave blocking circuit passes the rectification and voltage stabilization circuit and the output power The consumption measurement module is connected to the load end, and the two ends of the transmitting coil and the receiving coil are connected in parallel with a signal loading and extraction module with a controller and a signal modulation and demodulation module; A compensation coil is connected. The signal modulation and demodulation module, the controller, and the signal loading and extraction module all realize the wireless interaction and transmission of signals. The function and logic are: the controller communicates with external equipment to obtain the data signal to be transmitted; the signal modulation and demodulation module It receives the instructions of the controller, modulates the data signal to be transmitted according to the set rules or demodulates the modulated data signal contained in the energy; the signal loading and extraction module loads the modulated data signal into the energy for synchronization Transmit or extract data signals from energy.

The principle of electromagnetic coupling power transmission is to utilize the magnetic field between the transmitting coil and the receiving coil to realize the wireless transmission of electric energy. According to the transmission theory, the energy transmission efficiency is determined by the coupling coefficient (a kind of characteristic of the magnetic field) between the coils, the relationship between the two does not change linearly. Therefore, at the time of design, the optimal coupling coefficient of the system is often determined in the indoor test by simulating the target working conditions to guide the completion of the design of the non-contact transmission magnetic mechanism (the coupling coefficient is fixed). However, the downhole environment, bottomhole temperature and pressure often change. Affected by this, the optimal coupling coefficient will drift, resulting in the inherent coupling coefficient of the original design not being able to keep the system in the optimal energy transfer state. For this reason, a compensation coil is added in this scheme. The influence parameters of the compensation magnetic field include current magnitude, direction and number of coil turns. By changing the current and direction passing through the coil, a compensation magnetic field can be formed between the transmitting coil and the receiving coil. The compensation magnetic field is superimposed/cancelled with the fixed magnetic field between the transmitting coil and the receiving coil to change the magnetic field between the transmitting coil and the receiving coil, that is, to dynamically adjust the coupling coefficient of the non-contact transmission magnetic mechanism, so that the non-contact transmission magnetic mechanism is always at the optimum state.

Embodiment 2

Figure 2:
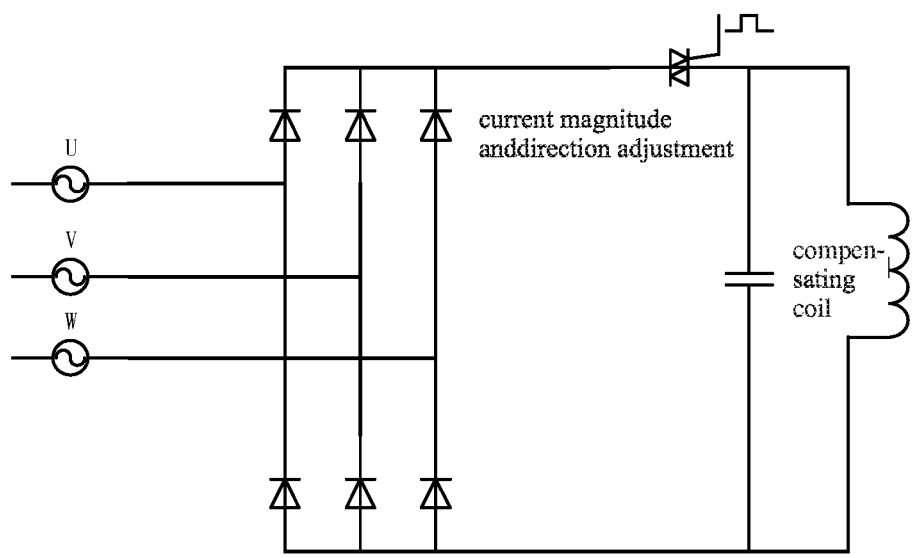
FIG. 2 is a schematic structural diagram of the wave blocking circuit of the magnetic field control electric energy conversion module of the present invention.

As a preferred implementation of the system of the present invention, on the basis of the technical solution of the above-mentioned embodiment 1, further, as shown in FIG. 2, the wave blocking circuit of the magnetic field regulation and control power conversion module includes three phases respectively connected through bidirectional diodes A compensation capacitor with a current direction regulating device and a parallel circuit of a compensation coil, the bidirectional diode is controlled on and off by PWM pulses.

Further, the signal loading extraction module extracts the electrical signals at the two ends of the transmitting coil and the receiving coil and generates a signal for the controller to identify through the demodulation of the signal modulation and demodulation module, the The controller sends a control instruction to the signal modulation and demodulation module according to the received signal, and the signal modulation and demodulation module converts the control instruction into a control signal for loading the signal to the extraction module.

In the magnetic field regulating circuit, each part acts as, the magnetic field regulation and control power conversion module is responsible for changing the current size and the direction output to the compensation coil, to realize the enhancement or reduction of the magnetic field; the choke circuit realizes current filtering, so that the current is smoother; and The compensation coil is wound by a Litz wire, and a magnetic field can be generated after passing an electric current.

The non-contact transmission magnetic mechanism design train of thought of this coupling coefficient dynamically adjustable of this program, increases a compensating coil, exerts influence to the magnetic field of transmitting coil or receiving coil, according to the offset situation of coupling coefficient, increases or reduces magnetic field Strength, thereby changing the coupling coefficient of the magnetic mechanism to achieve optimal energy transfer. The dynamic adjustment of the coupling coefficient of the magnetic mechanism is realized, which can ensure the system to work in the best energy efficiency state in any environment, and improve the system adaptability and economy.

Embodiment 3

Corresponding to a dynamic adjustment system for the coupling coefficient of the non-contact transmission magnetic mechanism in the technical solutions of the above-mentioned embodiments 1 and 2, further, this embodiment also provides a dynamic adjustment method for the coupling coefficient of the non-contact transmission magnetic mechanism, in which the non-contact energy Both the transmission end and the receiving end are equipped with a power monitoring device for monitoring the transmission power and reception power of the contact transmission system to calculate the energy transfer efficiency, that is, the energy transfer efficiency=received power/transmission power, if the energy transfer efficiency becomes low, Then add a forward current of size C to the compensation coil every fixed time for testing, and test N times in total to calculate the energy transfer efficiency;

if the change trend of energy transfer efficiency is a monotonous increase in N tests, continue to increase the forward current of size C to the compensation coil at fixed intervals X, and calculate the energy transfer efficiency in real time until the change trend of transfer efficiency begins to decrease, with the maximum The current corresponding to the transfer efficiency is the final correction current, and this current is continuously output to the compensation coil;

if in the N tests, the energy transfer efficiency increases and the extreme value appears, the current corresponding to the maximum transfer efficiency is used as the final correction current, and the current is continuously output to the compensation coil;

if the energy transfer efficiency decreases monotonously in N times of tests, turn on the reverse current adjustment, and apply a reverse current of size C to the compensation coil every fixed time X to increase the energy transfer efficiency until the extreme value appears, and the maximum transfer The current corresponding to the efficiency is the final correction current, which is continuously output to the compensation coil.

And, preferably, each time increasing forward current or applying reverse current fixed time interval is 100 ms, and each time increasing forward current or applying the size of reverse current is 10 mA.

Further, test number of times N is >=3 integer.

In addition, the corresponding current during the maximum transfer efficiency is the final correction current, after the continuous output of the current to the compensation coil, it also includes continuing to record the input power of the transmitting coil and the output power of the receiving coil respectively according to the fixed time interval, and calculates Energy transfer efficiency, if the energy transfer efficiency decreases, repeat the above adjustment That is, the specific idea of this plan is:

1. Under the optimal coupling coefficient calibrated in the laboratory, the energy transfer efficiency of the system, that is, output power/input power;

2. During well entry, the energy transfer efficiency of the system is monitored. If the transfer efficiency deviates, the magnetic field adjustment loop is activated to dynamically optimize the system coupling coefficient.

In the magnetic field regulating loop, each part acts as, the magnetic field regulates and controls the electric energy module, is responsible for changing the current size and the direction that are output to the compensation coil, to realize the enhancement or reduction of the magnetic field; the choke circuit, realizes current filtering, makes the current smoother; The compensation coil is wound by a Litz wire, and a magnetic field can be generated after passing an electric current.

2.1 open forward current regulation, every 100 ms, increase forward 10 ma electric current, and record energy transfer efficiency, test 3 times altogether;

2.2 If the energy transfer efficiency increases monotonously, increase the forward 10 ma current every 100 ms, and record the energy transfer efficiency until the transfer efficiency decreases. The current corresponding to the maximum transfer efficiency is the final correction current, and continue to output this current for compensation Coil;

2.3 If the energy transfer efficiency increases and an extreme value occurs, the current corresponding to the maximum transfer efficiency is the final correction current, and the current is continuously output to the compensation coil;

2.4 If the energy transfer efficiency decreases, turn on the reverse current adjustment, and apply a reverse 10 ma current every 100 ms until the transfer efficiency decreases. The current corresponding to the maximum transfer efficiency is the final correction current, and the current is continuously output to the compensation coil.

3, Monitor energy transfer efficiency, if efficiency reduces, then repeat step 2, make magnetic mechanism coupling coefficient dynamic response environment change, guarantee that non-contact energy transfer efficiency is best all the time.

What is claimed is:

1. A system for dynamically adjusting coupling coefficients of non-contact transmission magnetic mechanism, wherein: a power supply end is respectively connected with a non-contact transmission power conversion module and a magnetic field regulation power conversion module through an input power consumption measurement unit; the non-contact transmission power conversion module is connected with a transmitting coil via a tuned wave blocking circuit; the transmitting coil is correspondingly provided with a receiving coil, the receiving coil is provided on the tuned wave blocking circuit, the wave blocking circuit is connected to a load terminal through a rectifying voltage stabilizing circuit and an output power consumption measurement module; both ends of the transmitting coil and the receiving coil are connected in parallel with a signal loading and extraction module with a controller and a signal modulation and demodulation module; and the magnetic field control and electric energy conversion module is also connected with a compensation coil through a wave blocking circuit.

2. The system for dynamically adjusting coupling coefficients of non-contact transmission magnetic mechanism, as recited in claim 1, wherein the wave blocking circuit of the magnetic field control and electric energy conversion module comprises a three-phases compensation capacitor and compensation coil parallel-circuit respectively connected with a current direction regulating device via bidirectional diodes, and the bidirectional diode is turned on and off under control of a PWM pulse.

3. The system for dynamically adjusting coupling coefficients of non-contact transmission magnetic mechanism, as recited in claim 1, wherein the signal loading extraction module extracts the electrical signals at both ends of the transmitting coil and the receiving coil and passes through the demodulation of the signal modulation and demodulation module generates a signal for the controller to identify, and the controller sends a control instruction to the signal modulation and demodulation module according to the received signal, and the signal modulation and demodulation module converts the control instruction to a control signal for loading the extraction module on the signal.

4. The system for dynamically adjusting coupling coefficients of non-contact transmission magnetic mechanism, as recited in claim 1, wherein the non-contact energy transmission end and the receiving end are both provided with a power monitoring device for contacting transmission power and reception devices for monitoring the contact transmission system to calculate the energy transfer efficiency, that is, the energy transfer efficiency=received power/transmitted power, if the energy transfer efficiency becomes low, then every fixed time X add a positive direction of size C to the compensation coil, the current is tested for N times in total, and the energy transfer efficiency is calculated.

5. The system for dynamically adjusting coupling coefficients of non-contact transmission magnetic mechanism, as recited in claim 4, wherein if the change trend of energy transfer efficiency is a monotonous increase in N tests, continue to increase the forward current of size C to the compensation coil at fixed intervals X, and calculate the energy transfer efficiency in real time until the change trend of transfer efficiency begins to decrease, the current corresponding to the maximum transfer efficiency is the final correction current, and this current is continuously output to the compensation coil.

6. The system for dynamically adjusting coupling coefficients of non-contact transmission magnetic mechanism, as recited in claim 4, wherein if in the N tests, the energy transfer efficiency increases and the extreme value appears, the current corresponding to the maximum transfer efficiency is used as the final correction current, and the current is continuously output to the compensation coil.

7. The system for dynamically adjusting coupling coefficients of non-contact transmission magnetic mechanism, as recited in claim 4, wherein if the energy transfer efficiency decreases monotonously in N times of tests, turn on the reverse current adjustment, and apply a reverse current of size C to the compensation coil every fixed time X to increase the energy transfer efficiency until the extreme value appears, the current corresponding to the and the maximum transfer efficiency is the final correction current, which is continuously output to the compensation coil.

8. The system for dynamically adjusting coupling coefficients of non-contact transmission magnetic mechanism, as recited in claim 4, wherein each time the forward current is increased or the reverse current is applied at a fixed time interval of 100 ms, and a size of increasing the forward current or applying the reverse current for each time is 10 mA.

9. The system for dynamically adjusting coupling coefficients of non-contact transmission magnetic mechanism, as recited in claim 7, wherein each time the forward current is increased or the reverse current is applied at a fixed time interval of 100 ms, and a size of increasing the forward current or applying the reverse current for each time is 10 mA.

10. The system for dynamically adjusting coupling coefficients of non-contact transmission magnetic mechanism, as recited in claim 4, wherein the number of tests N is an integer $\geq 3$.

11. The system for dynamically adjusting coupling coefficients of non-contact transmission magnetic mechanism, as recited in claim 9, wherein the number of tests N is an integer ≥3.

12. A method for dynamically adjusting coupling coefficients of non-contact transmission magnetic mechanism, as recited in claim 1, wherein the current corresponding to the maximum transmission efficiency is the final correction current, comprising steps of: continuously outputting the current to the compensation coil finally.

13. A method for dynamically adjusting coupling coefficients of non-contact transmission magnetic mechanism, as recited in claim 11, wherein the current corresponding to the maximum transmission efficiency is the final correction current, comprising steps of: continuously outputting the current to the compensation coil finally.

14. The method for dynamically adjusting coupling coefficients of the non-contact transmission magnetic mechanism, as recited in claim 12, further comprising steps of continuing to extract the input power of the transmitting coil and the output power of the receiving coil through the records of the signal loading and extraction module with a controller and a signal modulation and demodulation module at both ends of the transmitting coil and the receiving coil according to a fixed time interval, calculating the energy transfer efficiency, and repeating the above adjustments if the energy transfer efficiency decreases.

15. The method for dynamically adjusting coupling coefficients of the non-contact transmission magnetic mechanism, as recited in claim 13, further comprising steps of continuing to extract the input power of the transmitting coil and the output power of the receiving coil through the records of the signal loading and extraction module with a controller and a signal modulation and demodulation module at both ends of the transmitting coil and the receiving coil according to a fixed time interval, calculating the energy transfer efficiency, and repeating the above adjustments if the energy transfer efficiency decreases.

* * * * *